United States Patent
Chi et al.

(10) Patent No.: US 9,928,399 B2
(45) Date of Patent: Mar. 27, 2018

(54) NON-CONTACT PALMPRINT AUTHENTICATION METHOD, DEVICE AND MOBILE TERMINAL

(71) Applicant: BEIJING ZHBOON INFORMATION TECHNOLOGY CO., LTD., Beijing (CN)

(72) Inventors: Jie Chi, Beijing (CN); Taiqing Wang, Beijing (CN)

(73) Assignee: BEIJING ZHBOON INFORMATION TECHNOLOGY CO., LTD. (CN)

( * ) Notice: Subject to any disclaimer, the term of this patent is extended or adjusted under 35 U.S.C. 154(b) by 233 days.

(21) Appl. No.: 15/031,945

(22) PCT Filed: Sep. 24, 2013

(86) PCT No.: PCT/CN2013/084118
§ 371 (c)(1),
(2) Date: Apr. 25, 2016

(87) PCT Pub. No.: WO2015/042783
PCT Pub. Date: Apr. 2, 2015

(65) Prior Publication Data
US 2016/0283770 A1   Sep. 29, 2016

(51) Int. Cl.
*G06K 9/00* (2006.01)
*G06K 9/03* (2006.01)
(Continued)

(52) U.S. Cl.
CPC ..... *G06K 9/00013* (2013.01); *G06K 9/00033* (2013.01); *G06K 9/00087* (2013.01);
(Continued)

(58) Field of Classification Search
CPC ........... G06K 9/00013; G06K 9/00033; G06K 9/00087; G06K 9/036; G06K 9/2027; G06K 9/22; H04N 5/2256
See application file for complete search history.

(56) References Cited

U.S. PATENT DOCUMENTS

2004/0057604 A1 * 3/2004 David ................ G06K 9/00067
382/115
2009/0268951 A1   10/2009 Zhang et al.
(Continued)

FOREIGN PATENT DOCUMENTS

CN   101 006 923    8/2007
CN   102 073 843    10/2007
(Continued)

OTHER PUBLICATIONS

International Search Report dated Jun. 17, 2014 issued in corresponding International patent application No. PCT/CN2013/084118.

*Primary Examiner* — Hung Dang
*Assistant Examiner* — Sunghyoun Park
(74) *Attorney, Agent, or Firm* — Ostrolenk Faber LLP

(57) ABSTRACT

A non-contact palmprint authentication method, device and mobile terminal, and the method is applied to a mobile terminal including a built in camera and a lighting lamp, including: enabling the built in camera when a palmprint authentication flow is started and keeping the working state of the lighting lamp to be set into a lighting mode when external illumination is insufficient, so as to provide supplementary lighting output for the built in camera; selecting a frame of new image from a video stream outputted by the built in camera as a candidate image, acquiring the current state parameter set of the built in camera according to the candidate image, judging whether each state parameter in the set satisfies a preset standard corresponding to the
(Continued)

parameter, and outputting the candidate image as a palmprint-matched contrast palmprint image if all the state parameters satisfy the corresponding preset standards; and, matching the contrast palmprint image with one or more pre-recorded benchmark palmprint images to perform user authentication. The authentication method can effectively improve the output quality of the contrast palmprint image, so as to improve the performance of the non-contact palmprint authentication technology.

21 Claims, 4 Drawing Sheets

(51) Int. Cl.
    *G06K 9/20*     (2006.01)
    *H04N 5/225*     (2006.01)
    *G06K 9/22*     (2006.01)

(52) U.S. Cl.
    CPC .......... *G06K 9/036* (2013.01); *G06K 9/2027* (2013.01); *G06K 9/22* (2013.01); *H04N 5/2256* (2013.01)

(56) References Cited

U.S. PATENT DOCUMENTS

| | | | |
|---|---|---|---|
| 2012/0194662 A1* | 8/2012 | Zhang | G06K 9/00033 348/77 |
| 2012/0206734 A1* | 8/2012 | Natsume | G06K 9/0004 356/611 |
| 2015/0252980 A1* | 9/2015 | Maeda | G06K 9/00013 382/115 |
| 2016/0070980 A1* | 3/2016 | Kumar | G06T 5/002 382/115 |

FOREIGN PATENT DOCUMENTS

| | | |
|---|---|---|
| CN | 101 211 410 | 7/2008 |
| CN | 103 268 483 | 10/2008 |
| CN | 101 055 618 | 5/2011 |
| CN | 101 281 600 | 5/2011 |
| CN | 102 073 861 | 5/2011 |
| CN | 103 310 200 | 9/2013 |

* cited by examiner

NON-CONTACT PALMPRINT AUTHENTICATION METHOD, DEVICE AND MOBILE TERMINAL

CROSS REFERENCE TO RELATED APPLICATIONS

The present application is a 35 U.S.C. § 371 National Phase conversion of PCT/CN2013/084118, filed Sep. 24, 2013, the disclosure of which is incorporated herein by reference. The PCT International Application was published in the Chinese language.

TECHNICAL FIELD

The present invention relates to the technical field of mobile terminal identity authentication, and more particularly, to a non-contact palmprint authentication method and device applied to a mobile terminal.

BACKGROUND ART

With the revolution of mobile communication technologies, mobile terminals such as a smartphone, a tablet, or the like, are becoming important tools for the daily life and work of people. For example, excluding those conventional applications like telephone and short message, people are able to utilize the smartphone to make various applications like social networking, online shopping and online payment. A number of valuable working data or privacy data may be possibly saved on the mobile terminal; therefore, uses pay more and more attention to the information security on the mobile terminal, and hope that these data which requires protection cannot be accessed in the case that the identity authentication is not passed.

In a traditional manner, the mobile terminal adopts a password or a manner of a combination of a user name and a password to verify the user identity. Problems of this manner present in natural contradictions between the security and convenience thereof. Firstly, if the user wants to improve the security, then complicated passwords need to be set, for instance, the passwords are a combination of letters, figures and special characters, and partial letters are even required to be capital possibly. Secondly, the user may possibly use passwords without relatedness at different identity authentication entrances. For example, it is better that the mailbox password of the user are not related to the QQ password; otherwise, once a certain password therein is known by others, the other one is very easy to be guessed.

In those applications with extremely strict requirements on security such as online payment and mobile banking, a multiple identity authentication manner will be employed. Excluding user login authentication, payment password dual authentication will also be introduced. At present, a manner of sending a verification code via short messages for authentication is also required by multiple online payments. In such a case, the user must accept these strict but inconvenient safety precautions in case of acquiring safe usage experience.

Some developers and vendors are trying to introduce a fingerprint authentication manner on the mobile terminal to substitute the traditional username/password authentication manner at present. This authentication manner has better convenience, but the security thereof is greatly reduced. This is because when the fingerprint authentication is used on the mobile terminal, once the mobile terminal is lost and obtained by others, since the user leaves a number of fingerprints thereof when using the mobile terminal previously, these fingerprints are very easy to be collected and used by others, causing the fingerprint authentication to perform practically no function. In fact, public security organs just utilize the feature of easy leaving of the fingerprints to establish a fingerprint data base for helping investigate various cases. Furthermore, the fingerprint authentication has a high implementation cost. In order to support the fingerprint authentication, the mobile terminal needs to be additionally equipped with a fingerprint identification hardware, and the entire design of the mobile terminal needs to be adjusted accordingly, which is not only contradicting to the lighting and thinning trend of the mobile terminal, but also introduces a problem of high developing and designing cost.

Therefore, all the traditional user identity authentication technologies cannot solve the contradiction between convenience and security generally.

SUMMARY OF THE INVENTION

In light of this, the present invention provides a non-contact palmprint authentication device applied to a mobile terminal including a built in camera and a lighting lamp, wherein the device includes:

a collection control unit configured to enable the built in camera when a palmprint authentication flow is started and keep the working state of the lighting lamp to be set into a lighting mode when external illumination is insufficient, so as to provide supplementary lighting output for the built in camera;

a screening output unit configured to select a frame of new image from a real time webcam video stream outputted by the built in camera as a candidate image, acquire the current state parameter set of the built in camera according to the candidate image, judge whether each state parameter in the set satisfies a preset standard corresponding to the parameter, output the candidate image as a palmprint-matched contrast palmprint image if all the state parameters satisfy the corresponding preset standards, and neglect the candidate image and reselect a frame of new image as a candidate image if any state parameter in the set does not satisfies the corresponding preset standard; and a palmprint matching unit configured to match the contrast palmprint image with one or more pre-recorded benchmark palmprint images according to a preset algorithm, and determine to pass authentication if the matching is successful; and output an authentication failure prompt to a user or return to the screening output unit if the matching is unsuccessful.

The present invention also provides a non-contact palmprint authentication method applied to a mobile terminal including a built in camera and a lighting lamp, wherein the method includes the following steps of:

step A. enabling the built in camera when a palmprint authentication flow is started and keeping the working state of the lighting lamp to be set into a lighting mode when external illumination is insufficient, so as to provide supplementary lighting output for the built in camera;

step B. selecting a frame of new image from a real time webcam video stream outputted by the built in camera as a candidate image;

step C. acquiring the current state parameter set of the built in camera according to the candidate image, judging whether each state parameter in the set satisfies a preset standard corresponding to the parameter, outputting the candidate image as a palmprint-matched contrast palmprint image if all the state parameters satisfy the corresponding preset standards, and neglecting the candidate image and returning to step B if any state parameter in the set does not satisfies the corresponding preset standard; and step D. matching the contrast palmprint image with one or more pre-recorded benchmark palmprint images according to a preset algorithm, and determining to pass authentication if the matching is successful; and outputting an authentication failure prompt to a user or returning to step B if the matching is unsuccessful.

The present invention can effectively improve the output quality of the contrast palmprint image in non-contact palmprint authentication, so as to improve the performance of the non-contact palmprint authentication technology.

DETAILED DESCRIPTION OF THE PREFERRED EMBODIMENTS

Figure 1:
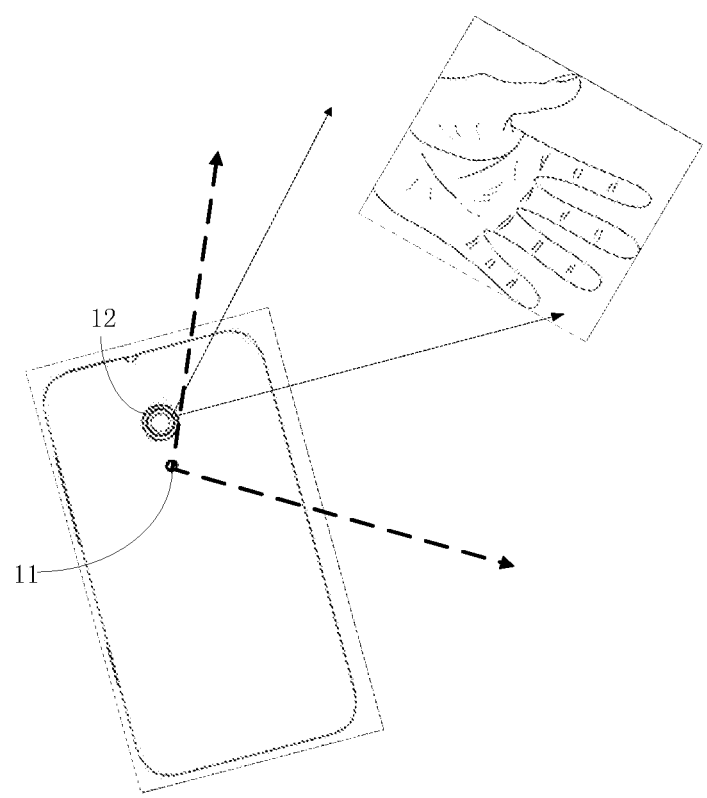
FIG. 1 is a typical application scenario diagram of the present invention.

In order to solve the problems of the prior art, those technologies like human face identification are being studied presently in the industry to implement user identity authentication. However, this technology cannot substantially improve the natural contradiction between convenience and security yet. Take human face identification for example, the security problems thereof are as follows: the acquisition of a facial image of the user is also relatively easy. The user may save a number of photos thereof on internet or other terminals, while these photos are possibly acquired by others easily; in this way, unlawful users may use these photos to camouflage and pass the human face authentication.

Compared with fingerprints and human faces, the probability for the palmprint to be acquired by others is very slim. This is because that firstly, the hand operation of people while using the mobile terminal mostly depends on fingers. Secondly, during daily life, the palm of people when using the hand is usually in a folding state at a certain extent; even if the palmprint is left, the left palmprint is quite different from the palmprint when the palm is unfolded, and is very different to camouflage and pass through the identity authentication. Moreover, the user will not save clear palm photos usually; therefore, the defect that the photo is acquired by others for utilization will not exist either.

However, the present palmprint authentication implementation technologies still need to depend on a specialized hardware device, which will also cause the problems of higher cost and insufficient convenience similarly. For example, Chinese patent application CN101833647A discloses a palmprint acquisition device and a corresponding processing method. In this solution, although the defect in the conventional technology which requires shielding ambient lights is improved, a specialized hardware needs to be introduced still, and a manner of a flash or an external infrared LED is used to finish the palmprint authentication process, and moreover, it is also implemented through contact palmprint authentication. In contact palmprint authentication technology, the palm of the user needs to be fixed on a position keeping a predetermined distance from a built in camera through a specific positioning member (for example, a hand placing platform), and the palm of the user cannot move freely. Apparently, this technology has very poor convenience, and cannot be applied to a mobile terminal. In addition, Chinese patent application CN1972186A discloses a movable identity authentication system and authentication method thereof. In this technology, a mobile device photographing function is used to help a flash to acquire a palmprint to conduct palmprint authentication, which brings certain convenience; however, the quality of the palmprint image acquired through this solution is lower; therefore, the requirement on the a built-in palmprint matching algorithm is very high, and this solution still has a certain distance from actual commercial use entirely.

With respect to the defects of the present technologies, the present invention proposes a non-contact palmprint authentication solution so as to substantially improve the technological base of the non-contact palmprint authentication, and provide technological guarantee for the non-contact palmprint authentication technology on convenience breakthrough. The so-called non-contact palmprint authentication means that the authenticated palm does not need to be fixed on a certain positioning member.

Figure 2:
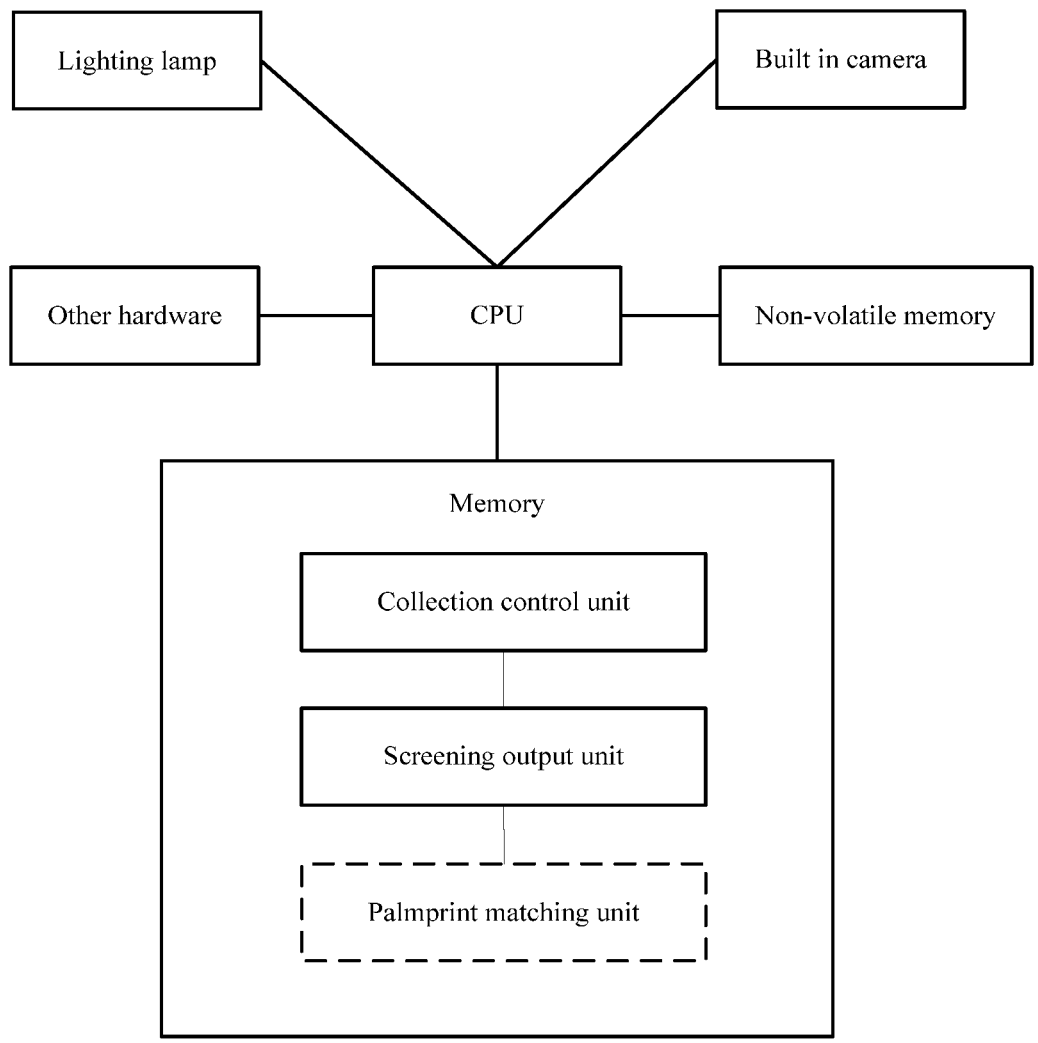
FIG. 2 is a schematic diagram of a logic structure of a non-contact palmprint authentication device and a basic hardware environment thereof according to one embodiment of the present invention.

In a preferred implementation manner, the present invention provides a non-contact palmprint authentication device implemented on the basis of a computer program, wherein the device is applied to a mobile terminal (taking a smartphone for example only hereinafter). As shown in FIG. 2, the smartphone usually includes a CPU, a memory, a built in camera 12, a non-volatile memory, a lighting lamp 11 and various input and output hardware including a touch display screen, and the like.

In a preferred manner, the built in camera 12 and the lighting lamp 11 (for example, made of LED) are usually located at the same side of the smartphone, for instance, the back of the smartphone. In view of deformation of structure and appearance design, during the implementation process of the present invention, the position relationship between the built in camera 12 and the lighting lamp 11 can be further broadened as long as the path for the built in camera 12 to collect images has intersection with the light output range of the lighting lamp 11. In fact, all smartphones having a flashing photographing function have the basic hardware environment for implementing the present invention. As shown in FIG. 1, a thicker dotted line represents the light output range of the lighting lamp 11, while a thinner dotted line represents the path range for the built in camera 12 to collect images.

On the aspect of implementation, the device can be served as an independent mobile application (APP) and installed on a mobile phone, and can also be served as a character function and integrated in other mobile applications.

Please refer to FIG. 2. In a software implementation manner (not excluding other implementation manners), the device is served as a virtual device on a logic level, and mainly includes a collection control unit, a screening output unit and a palmprint matching unit.

Figure 3:
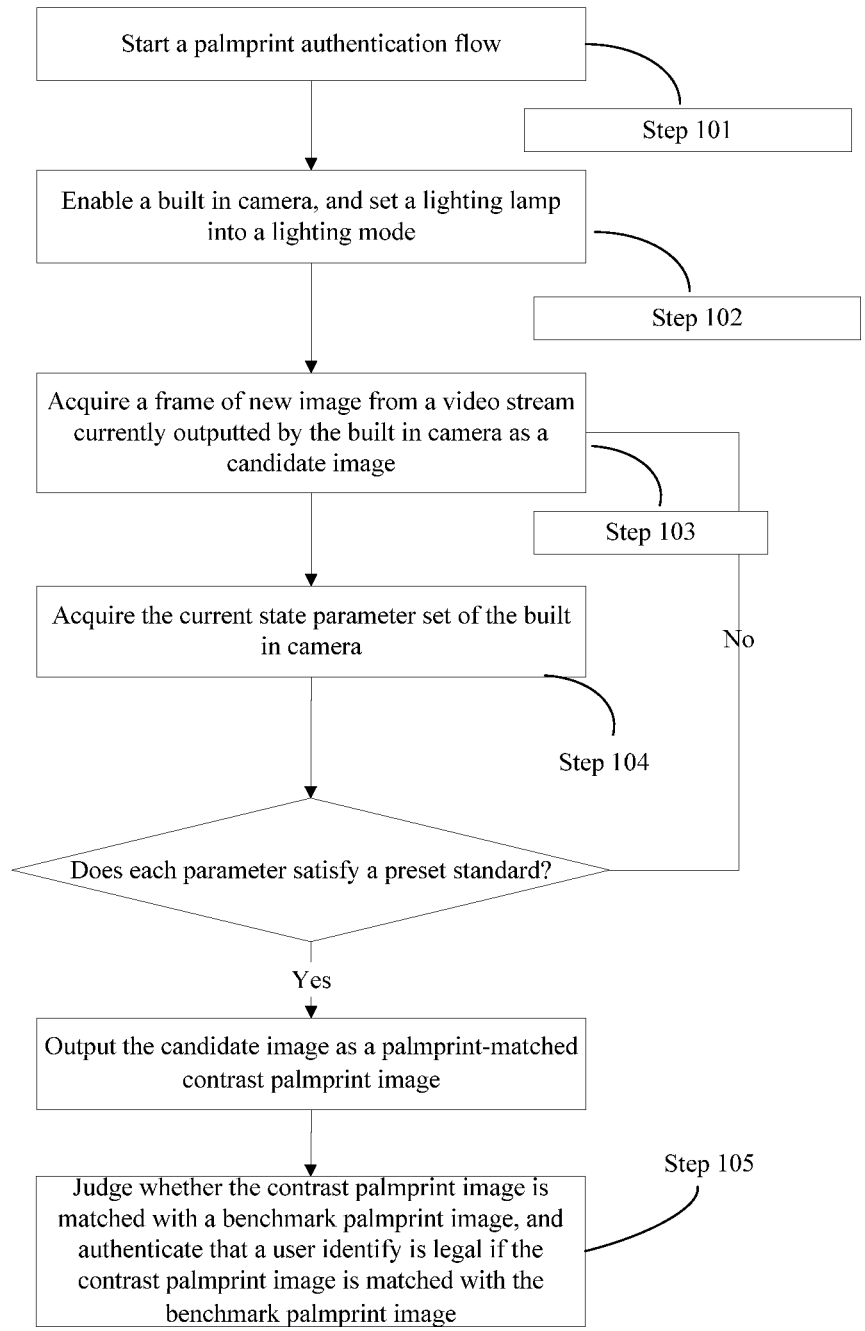
FIG. 3 is a flow chart of a non-contact palmprint authentication method according to one embodiment of the present invention.

Please refer to FIG. 3. The use and operation process of the device includes the following steps.

In step 101, the collection control unit starts a palmprint authentication flow according to a specific instruction.

In step 102, the collection control unit enables the built in camera when the palmprint authentication flow is started, and keeps the lighting lamp to be set into a lighting mode at least when external illumination is insufficient.

In step 103, the screening output unit acquires a frame of new image from a real time webcam video stream currently outputted by the built in camera as a candidate image.

In step 104, the screening output unit accordingly acquires the current state parameter set of the built in camera according to the candidate image, judges whether each state parameter in the set satisfies a preset standard corresponding to the parameter, outputs the candidate image as a palmprint-matched contrast palmprint image if all the state parameters satisfy the corresponding preset standards, and neglects the candidate image and returns to step 103 if any state parameter in the set does not satisfies the corresponding preset standard.

In step 105, the palmprint matching unit judges whether the contrast palmprint image is matched with a benchmark palmprint image, and authenticates that the user identify is legal if the contrast palmprint image is matched with the benchmark palmprint image.

The palmprint authentication can be used as an identity verification mechanism for various mobile applications. If the user wants to perform a specific operation, such as accessing important data, then the user needs to verify the identity thereof through the palmprint authentication. In order to implement the palmprint authentication, it is usually desirable to pre-record one or more user palmprint images as benchmark palmprint image. The benchmark palmprint image is the base of the palmprint authentication. A contrast palmprint image collected subsequently is matched with the benchmark palmprint image. If the matching is successful, then the authentication is passed.

Various manners may be employed for recording the benchmark palmprint image. One manner is that the user uploads a frame of image as the benchmark palmprint image, for instance, a palmprint image shot by other photographing device is used as the benchmark palmprint image. In a probable implementation manner, a method similar to the foregoing contrast palmprint image collection may also be used to collect one benchmark palmprint image through a smartphone and save the benchmark palmprint image in the smartphone.

That is, one benchmark recording flow may be set in the mobile APP for the user to collect and save the benchmark palmprint image. In this manner, the collection control unit accordingly enables the built in camera when the benchmark recording flow is started and keeps the working state of the lighting lamp to be set into a lighting mode when external illumination is insufficient, so as to provide supplementary lighting output for the built in camera; the screening output unit screens images according to step 103 and step 104; but differently, the screening output unit will save the outputted contrast palmprint image as the benchmark palmprint image in the benchmark recording flow.

These present implementations will also be added during the productization implementations of the present invention. However, the process of recording the benchmark palmprint image and judging whether the contrast palmprint image is matched with the benchmark palmprint image can be implemented by referring to the prior art. The present invention does not pay attention to the advantages and disadvantages of the matching algorithm itself. The target of the present invention is to reduce the development difficulty and development cost of palmprint authentication software products by improving the flows of contrast palmprint image collection and palmprint authentication.

After the user palmprint served as the benchmark palmprint image is completely recorded, the user may trigger the start of the palmprint authentication flow through a specific interactive interface possibly. For example, the user may click a specific touching button on a screen to trigger the start of the palmprint authentication flow. Certainly, the start of the palmprint authentication flow may be triggered by a specific application possibly, for example, a certain mobile application may possibly trigger the start of the palmprint authentication flow when finding that some conditions are satisfied.

In the present invention, after the palmprint authentication flow is started, the collection control unit will enable the built in camera and set the lighting lamp under a lighting mode. On a smartphone, after the built in camera is started, it will automatically and continuously collect images and output a video stream with a certain frame rate through a built-in sensor (Sensor) chip, for example, a video stream with a frame rate of 30 frame/second. This video stream will usually be displayed on a mobile screen, so that the user can intuitively sense the direction or target aligned by the built in camera.

If a frame of contrast palmprint image needs to be acquired and matched with the benchmark palmprint image, a direct thought is to refer to the photographing application of the smartphone for implementation. In the photographing application, when the user clicks a photographing application icon on the screen, the built in camera will open, and output and save the frame of image collected currently according to user operations. If other application needs to acquire a frame of image, a usual practice is also to simulate the function of the photographing application for implementation.

When the external illumination is insufficient, the photographing application will automatically utilize a flash to supplement light. This manner may possibly satisfy the user requirements in other application scenarios which need to acquire a frame of image, but has problems during the palmprint authentication process. Firstly, when the user uses the smartphone to align with the palm, the distance is usually closer, which is generally in a range of several centimeters. If an automatic flashing mode is selected, image overexposure is easily caused in many occasions, particularly when the external illumination is slightly insufficient. However, if a manual flashing start mode is selected, then not only the convenience is poor, but also the user requirement is higher. Secondly, because the flashing is finished instantly, if the palm of the user is moving while flashing, the movement of the palm will cause blurred motion, and finally causes poorer quality of the frame of image shot currently. The relative distance between the palm of the user and the mobile phone will change anytime, and the continuous change of the distance directly and significantly affects the focusing state and the exposure state. The movement of the palm of the user cannot be controlled, while the light emitting time of the flash is instant; therefore, there is contradiction difficult to overcome between the flash mode and the use mode of the mobile terminal, which causes that a palmprint image satisfying the palmprint authentication quality requirement cannot be acquired usually.

Therefore, when performing palmprint authentication, if a traditional photographing application manner which follows the general technical implementation thought of the art is adopted to collect the contrast palmprint image, it is substantially difficult to collect the contrast palmprint image with better image quality. In such a case, developers are required to develop more powerful algorithm to make up the quality defect of the contrast palmprint image. However, the development cost and difficulty will be increased undoubtedly in this way, but the entire effect will still be very poor.

Moreover, from the view of the actual application, the user may perform palmprint authentication on various occasions. Acquiring the contrast palmprint image using a flashing mode will undoubtedly cause light pollution, and affect surrounding crowds. Such product implementation is inconvenient to be used in public occasions.

In fact, the thought of the flashing mode is mainly affected by the technical thought of the conventional photographing technology. It is expected to output high power illumination to make up the insufficient illumination. Moreover, due to the indeterminacy of the object distances in most photographing applications, the lighting mode is not suitable for the conventional photographing demands. For example, when the photographed target is far, the lighting mode is meaningless usually. However, concrete to the palmprint authentication application, because the palmprint is usually closer to the built in camera, the lighting mode can be completely adopted for supplementary lighting during photographing.

In other words, the present invention targets at the practicality of the palmprint authentication, considers the fact that the palmprint is usually closer to the built in camera, and employs the lighting mode for supplementary lighting. Although the supplementary lighting intensity is much smaller than that of the flashing mode, not only excellent supplementary lighting effect can be achieved, but also overexposure caused by the start of the lighting lamp can be substantially avoided because the lighting lamp is closer to the palm.

It should be particularly noted that because the position of an external light source is uncertain, the present invention, by using the lighting mode of the mobile phone for supplementary lighting during image shooting, can effectively improve backlighting and frontlighting from external illumination as well as negative influences produced by illumination from different angles, i.e., eliminate the negative influences brought by the ambient light, so as to ensure that the image output quality intervals become more convergent. For example, compared with the photographing under the lighting mode, when the flashing function is started for photographing, the quality change interval of the image outputted by the built in camera is larger if other conditions are consistent. That is, the image quality output is not stable.

Moreover, the output power of the lighting lamp under the flashing mode is very high, and cannot continuously provide illumination. If continuously providing illumination, the lighting lamp will be burnt out easily.

On the basis of employing the lighting mode to improve the quality of the contrast palmprint image, the present invention also screens multiple frames of images continuously outputted by the built in camera. After the built in camera is enabled, an operating system may set the built in camera under a continuous auto-focusing mode by default. In view that the operating system may not certainly set the built in camera under the continuous auto-focusing mode by default, the present invention further optimizes the process of collecting the contrast palmprint image. For instance, in an iOS operating system, the operating system allows the application to control the built in camera to work under any one of an one-off auto-focusing mode, a continuous auto-focusing mode and a manual-focusing mode. In an iOS 6.0 operating system, the expression of the three modes is as follows:

AVCaptureFocusModeLocked=0, //the focal length is locked, i.e., focusing is not performed;

AVCaptureFocusModeAutoFocus=1, //one focusing is performed, and then the focal length is locked; and AVCaptureFocusModeContinuousAutoFocus=2, //auto-focusing is continuously performed.

Similarly, for exposure adjusting, the iOS also has three modes for the user to select: a fixed exposure mode, one-off automatic exposure mode and a continuous auto-exposure mode. In an iOS 6.0 operating system, the expression of the three modes is as follows:

AVCaptureExposureModeLocked=0, //the aperture is locked, i.e., exposure adjusting is not performed;

AVCaptureExposureModeAutoExpose=1, //one exposure adjusting is performed, and then the aperture is locked; and AVCaptureExposureModeContinuousAutoExposure=2, //the automatic exposure adjusting is continuously performed.

In order to be able to continuously acquire image output with higher quality, the collection control unit, when enabling the built in camera, further controls the built in camera through an interface provided by the operating system, so that the built in camera works under the continuous auto-focusing mode and the continuous auto-exposure mode. Similarly, it can be hinted if the implementation process relates to a white balance state parameter, the collection control unit needs to make similar settings on a white balance adjusting mode.

A screening principle is whether each state parameter in the current state parameter set of the built in camera satisfies a preset standard corresponding to the parameter; and if all the parameters satisfy the preset standards, then the frame of image at current is an acceptable contrast palmprint image. The state parameter set at least includes a state parameter. In a probable implementation manner, the collection state set may include any one or more of a focusing state parameter, an exposure state parameter and a white balance state parameter. Certainly, if the operating system is capable of providing more state parameters, then the parameters may be selected according to the application demands.

In a probable detailed implementation manner, when the screening output unit acquires a frame of image from the built in camera, it needs to make a selection according to the current focusing state parameter and the current exposure state parameter of the built in camera. Usually, the focusing state parameter can respectively characterize the two states including focusing completion and focusing in progress, and the exposure state parameter can also characterize the two states including exposure in adjusting and exposure adjusting completion. Certainly, with the development of technology, the focusing state parameter and the exposure state parameter recorded in the operating system may possibly have more states, and it is even possible to integrate a plurality of state parameters together to express. During the actual implementation process of the present invention, those skilled in the art can make adaptive adjusting according to these changes.

During the actual implementation process of the present invention, the focusing state parameter and the exposure state parameter satisfying the requirements can be saved as acceptable preset standards. Furthermore the preset standard for each parameter may be different due to different operating systems. Once the screening output unit finds that the two state parameters respectively satisfy the corresponding preset standards, then it can be determined that the current frame of image is an acceptable contrast palmprint image. For example, in the implementation manner of the present invention, it is provided that when the focusing state parameter is 1, it represents focusing completion, and when the focusing state parameter is 0, it represents focusing in progress; when the exposure state parameter is 1, it represents exposure adjusting completion, and when the exposure state parameter is 0, it represents exposure in adjusting. Then, when the state parameter set acquired by the screening output unit is 11, it can be only determined that the candidate image is an acceptable contrast palmprint image, while when the state parameter set is 00, 01 or 10, then the candidate image can be neglected.

Take the implementation under the iOS 6.0 operating system for example. For judging whether the focusing state parameter satisfies the preset standard, the built in camera can be judged whether to be in focusing adjusting through a corresponding interface provided by the system. To be specific, it may be judged based a returned value acquired by calling in the following interface, @property(nonatomic, readonly, getter=isAdjustingFocus) BOOL adjustingFocus. If YES is returned, then it represents to be in a state of adjusting focusing. If NO is returned, then it presents that no focusing will be performed, and it can be understood as a focusing completion state.

For judging whether the exposure state parameter satisfies the preset standard, the built in camera can be judged whether to be in exposure adjusting through judging whether the built in camera is performing exposure adjusting. To be specific, it may be judged based a returned value acquired by calling in the following interface, @property(nonatomic, readonly, getter=isAdjustingExposure) BOOL adjustingExposure. If YES is returned, then it represents to be in a state of exposure in adjusting. If NO is returned, then it presents that no exposure adjusting will be performed. That is, it characterizes exposure adjusting completion.

Figure 4:
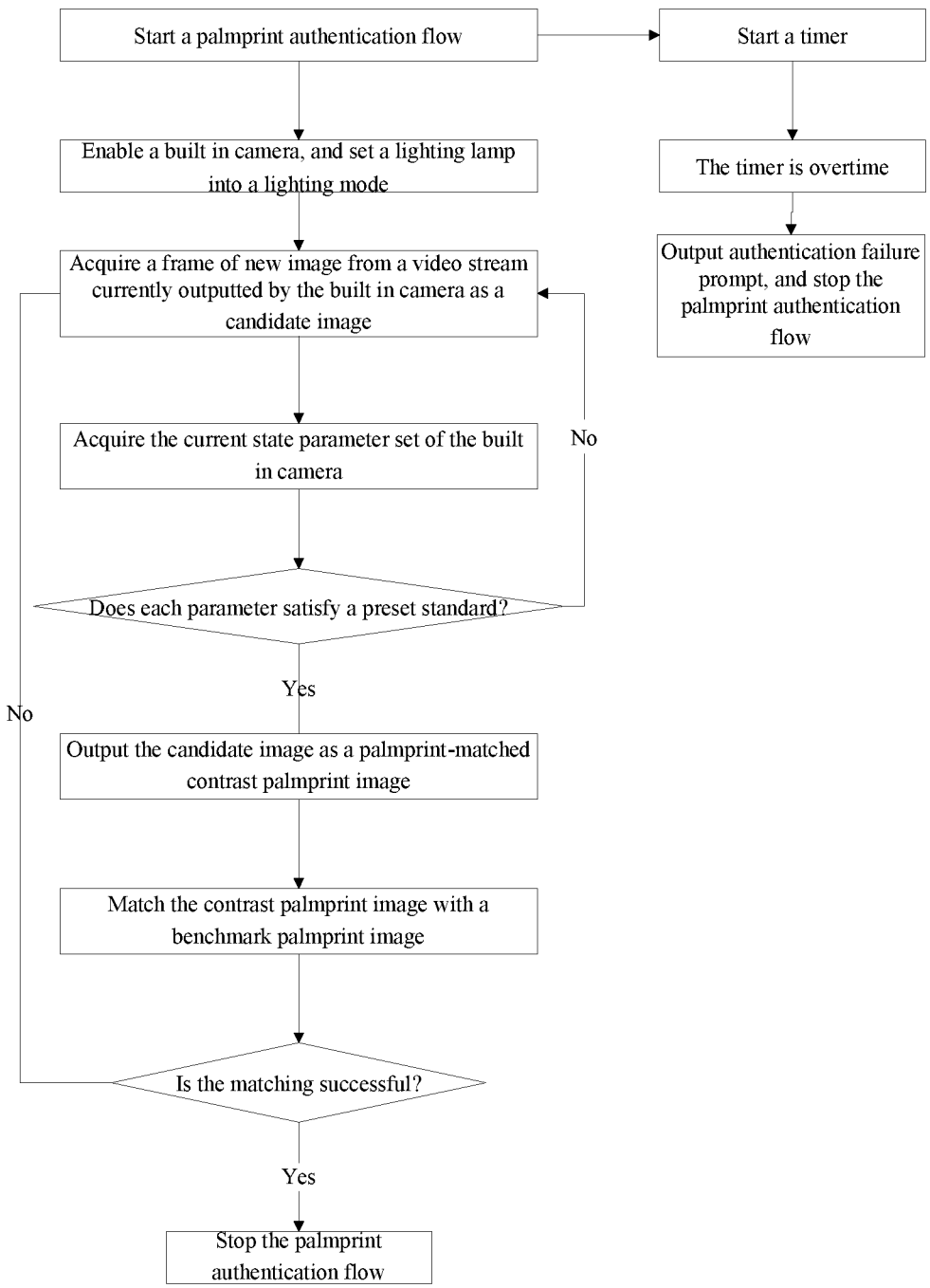
FIG. 4 is a flow chart of a non-contact palmprint authentication method according to another embodiment of the present invention.

After a frame of contrast palmprint image is acquired, the contrast palmprint image can be outputted to the palmprint matching unit in the device. The palmprint matching unit can match the contrast palmprint image with the pre-recorded benchmark palmprint image using a preset matching algorithm for example. If the matching is successful, then the user identity authentication is passed. If the matching is not successful, then it indicates that the current contrast palmprint image cannot be from the palm of a legal user, or the quality of the current contrast palmprint image may still not satisfy the requirement of the matching algorithm possibly. At this moment, an authentication failure prompt may be outputted to the user. Please refer to FIG. 4. In a probable implementation manner, when the matching is not successful, the dependability of the authentication result can be improved if the candidate image is acquired again.

In view that a legal user may collect image under any illumination environment, if some illumination environments are extremely severe, then the contrast palmprint image screened this time may not satisfy the requirement of the matching algorithm possibly. One manner is to output an authentication failure prompt to the user immediately when the authentication is failed. Another manner is to try to screen for multiple times and output a contrast palmprint image, which can improve the dependability of the identity authentication result. Further, in order to further improve the usage experience of the user and avoid such a circle of repeated screening and repeated failure, the collection control unit can start a timer with a predetermined duration after the palmprint authentication flow is started, for instance, a 10 s timer, and stops the palmprint authentication flow when the timer is overtime but the palmprint matching is still not successful, and outputs an authentication failure prompt to the user at the same time.

In view of the popularization of networked applications, the contrast palmprint image can not only be outputted to the local palmprint matching unit, and may also be outputted to a remote server through the network. The remote server can also be equipped with a palmprint matching unit, which can similarly adopt a preset contrast algorithm to compare the contrast palmprint image with a benchmark palmprint image pre-recorded on the server. In such a case, the palmprint authentication flow can be controlled by the remote server.

It can be seen from the above descriptions that the manner for the present invention to collect frame images is totally different from a conventional manner of collecting frame images. The present invention checks the current built in camera state with respect to the candidate image, and only acquires the candidate image as the contrast palmprint image when the built in camera state complies with the preset standard; otherwise, neglects the candidate image and collects next frame of image.

Seen from a comprehensive aspect, the present invention, on the base of improving the quality of each frame of image of the video stream entirely, further screens the image with better image quality in the video stream, which is totally different from the conventional manner of acquiring a photographing application. The photographing manner only acquires the image at a certain moment according to a user or software instruction, and does not screen the image according to the current state parameters of the built in camera like focusing state and exposure state.

In the above implementation manner, the entire process does not require user intervention, and this manner is called as automatic scanning manner in the present invention. As previously mentioned, all the smartphones are possibly set under the continuous auto-focusing mode by default or by the collection control unit; therefore, the built in camera can focus automatically after being started. Based on this, in order to provide different experiences to the user, the present invention provides a manual clicking implementation manner in another probable implementation manner. This manner allows the user to determine when to start screening images through clicking.

In the manual clicking implementation manner, the device further includes a screening enabling unit. The screening enabling unit is further configured to, after the palmprint authentication flow is started, wait for a screening contrast instruction of the user firstly, and then enable the screening output unit after the screening contrast instruction issued by the user is received. The built in camera after being started will focus automatically. However, the screening output unit does not screen any image at this moment. Until the user issues a screening contrast instruction through clicking a touch display screen, the screening output unit starts performing the screening treatment of the contrast palmprint image in step 103.

In this way, because the user may view the frame definition on the screen through unaided eyes, and only clicks the screen to trigger the screening treatment of the contrast palmprint image when the frame is clear, the time from screening to passing the authentication will be greatly shortened. It is noteworthy that in the implementation manner, the screening output unit can only acquire the contrast palmprint image through a certain screening operations still; however, this screening process may possibly be greatly shortened.

Both the automatic scanning manner or the manual clicking manner have no requirement on the movement of the authenticated palm of the user, or there are no measures to guide the user to place the palm in a distance interval suitable for acquiring high quality images. In order to quicken the palmprint authentication speed, the present invention provides a guide measure to guide the user to place the palm in a probable implementation manner.

In the implementation manner of guiding the user to place the palm, the collection control unit can also respectively set the focusing parameter (focal length usually) and the exposure parameter (like aperture) of the built in camera into preset fixed values when enabling the built in camera. Certainly, with the ability change of the main built in camera hardware, the fixed values may possibly be changed continuously. Moreover, the corresponding fixed values of mobile phones in different models may possibly be different. In the implementation manner, if the user enters a collection distance interval corresponding to the fixed values without moving the palm, then the screening output unit cannot screen the contrast palmprint image satisfying the preset standard because the focal length has already been a fixed value just like a fixed-focus built in camera. That is, in step 104, unclear focusing or underexposure of the candidate palmprint image may be caused if the palm of the user does not enter a preferable collection distance. At this moment, the screening output unit will neglect the image because the state parameter of the built in camera acquired on the basis of the candidate palmprint image does not satisfy the preset standard. Therefore, in order to enable the user to change the distance between the palm and the built in camera by moving the palm or the smartphone as soon as possible, the collection control unit may output a distance error prompt message to the user when any one of the focusing state parameter and the exposure state parameter in the state parameter set does not satisfy the corresponding preset standard. This prompt message can be implemented through multiple manners, which may possibly be words, images or sounds, and even be implemented through the change of the background color of the screen. For example, when the palm of the user is not in a preferable collection distance interval, the background of the screen presents red different to the normal default color; if the palm of the user is in the preferable collection distance interval, the background of the screen restores to the normal default color because it does not need to output a distance error prompt message.

In a probable implementation manner, the collection control unit can disable the built in camera and the lighting lamp after the authentication is passed. For the situation that the authentication is failed, the processing of the collection control unit may be relatively flexible. For example, the collection control unit may either disable the built in camera and the lighting lamp, or only disable the lighting lamp, and may also perform no processing, but keep to continuously enable the built in camera and the lighting lamp, and wait for the user to trigger a new palmprint authentication flow again or a quit instruction of the user; if the user quits, then the built in camera and the lighting lamp need to be disabled.

In a probable implementation manner, the lighting lamp can be fixedly kept under the lighting mode. In this way, the lighting lamp keeps supplementary lighting output when the external illumination is insufficient, which can significantly improve the image quality. The lighting lamp still keeps supplementary lighting output when the external illumination is better, which may also improve the image quality to some degree, for instance, improve the influences of front-lighting and backlighting. This implementation manner has good effect for improving the image quality, but the energy saving effect thereof is a little poor.

In another probable detailed implementation manner, the collection control unit will read a light-sensing sensor self-equipped for the smartphone to acquire the current lighting parameter, and control the lighting lamp to perform supplementary lighting output under a corresponding lighting level according to the lighting parameter. This implementation manner may implement lower intensity supplementary lighting output in the case that the illumination is better, and the lighting lamp can even be not opened. When the external illumination is very poor, the lighting lamp can be controlled to implement higher intensity supplementary lighting output.

That is, in this implementation manner, the control of the collection control unit on the lighting lamp includes various situations, which are respectively corresponding to different lighting levels. For instance, under a first lighting level, the collection control unit does not enable the lighting lamp; when the external lighting level drops to a second lighting level, the collection control unit sets the lighting lamp into the lighting mode, and set the supplementary lighting output intensity of the lighting lamp as a first supplementary lighting intensity; and under a third lighting level, the collection control unit sets the lighting lamp into the lighting mode, and set the supplementary lighting output intensity of the lighting lamp to be higher, which is a second supplementary lighting intensity.

The above two implementation manners can both improve the image quality in the case that the illumination is insufficient. In the case that the illumination is better, one implementation manner focuses on the image quality, while the other focuses on energy saving.

It can be seen from the description in the previous paragraph that the keeping the lighting lamp into the lighting mode when the external illumination is insufficient according to the present invention does not particularly refer to a triggering relationship. That is, in the present invention, insufficient external illumination may possibly trigger the lighting lamp to be disabled, and perform supplementary lighting output at corresponding level. But in a probable implementation manner, the lighting lamp is working under the lighting mode when the built in camera is enabled, and is not directly related to the external illumination. Therefore, the keeping the lighting lamp in the lighting mode when the external illumination is insufficient is an expression of a state relationship, rather than an expression of a triggering relationship.

The foregoing is merely preferred embodiments of the invention, but is not intended to limit the invention; and any modification, equivalent replacement, improvement and the like made within the spirits and principles of the invention shall all fall within the protection scope of the invention.

The invention claimed is:

1. A non-contact palmprint authentication device applied to a mobile terminal comprising a built in camera and a lighting lamp, characterized in that, the device comprises:
   a collection control unit configured to enable the built in camera when a palmprint authentication flow is started and keep the working state of the lighting lamp to be set into a lighting mode when external illumination is insufficient, so as to provide supplementary lighting output for the built in camera;
   a screening output unit configured to select a frame of new image from a real time webcam video stream outputted by the built in camera as a candidate image, acquire the current state parameter set of the built in camera according to the candidate image, judge whether each state parameter in the set satisfies a preset standard corresponding to the parameter, output the candidate image as a palmprint-matched contrast palmprint image if all the state parameters satisfy the corresponding preset standards, and neglect the candidate image and reselect a frame of new image as a candidate image if any state parameter in the set does not satisfies the corresponding preset standard; and a palmprint matching unit configured to match the contrast palmprint image with one or more pre-recorded benchmark palmprint images according to a preset algorithm, and determine to pass authentication of a user if the matching is successful; and output an authentication failure prompt to a user or return to the screening output unit if the matching is unsuccessful.

2. The device according to claim 1, wherein the state parameters comprise a focusing state parameter and an exposure state parameter, wherein:
the focusing state parameter comprises focusing completion and focusing in progress;
the exposure state parameter comprises exposure in adjusting and exposure adjusting completion; and
the preset standards are respectively that the focusing state parameter characterizes focusing completion and the exposure state parameter characterizes exposure adjusting completion.

3. The device according to claim 1, wherein the collection control unit is configured for:
setting the focusing parameter and the exposure parameter of the built in camera into fixed values; and
outputting a distance error prompt message to the user when any one of the focusing state parameter and the exposure state parameter of the state parameter set does not satisfy the corresponding preset standard.

4. The device according to claim 1, wherein the collection control unit is also configured to disable the built in camera and the lighting lamp after passing the authentication.

5. The device according to claim 1, wherein the collection control unit is also configured to start a timer having a preset duration when the palmprint authentication flow is started, and stops the palmprint authentication flow and outputs an authentication failure prompt to the user in the case that the timer is overtime.

6. The device according to claim 1, wherein the device further comprises a screening enabling unit, wherein:
the screening enabling unit is configured to, after the palmprint authentication flow is started, enable the screening output unit in the case that a screening contrast instruction issued by the user is received.

7. The device according to claim 1, wherein
the collection control unit is also configured to enable the built in camera when a benchmark recording flow is started and keep the working state of the lighting lamp to be set into a lighting mode when external illumination is insufficient, so as to provide supplementary lighting output for the built in camera; and
the screening output unit is also configured to pre-save the contrast palmprint image outputted by the built in camera as a benchmark palmprint image in the case that the benchmark recording flow is started.

8. The device according to claim 1, wherein the collection control unit is also configured to set the working state of the lighting lamp into a lighting mode when external illumination is sufficient, so as to provide supplementary lighting output for the built in camera.

9. The device according to claim 1, wherein
the collection control unit is also configured to determine a lighting level according to an external lighting parameter provided by a light-sensing sensor of the mobile terminal, and determine the supplementary lighting output intensity of the lighting lamp according to the lighting level.

10. The device according to claim 1, wherein the collection control unit is also configured to, when enabling the built in camera, set the built in camera into a continuous auto-focusing mode and a continuous auto-exposure mode.

11. A mobile terminal comprising a built in camera and a lighting lamp, further comprising the non-contact palmprint authentication device according to claim 1.

12. A non-contact palmprint authentication method applied to a mobile terminal comprising a built in camera and a lighting lamp, wherein the method comprises the following steps of:
step A. enabling the built in camera when a palmprint authentication flow is started and keeping the working state of the lighting lamp to be set into a lighting mode when external illumination is insufficient, so as to provide supplementary lighting output for the built in camera;
step B. selecting a frame of new image from a real time webcam video stream outputted by the built in camera as a candidate image;
step C. acquiring the current state parameter set of the built in camera according to the candidate image, judging whether each state parameter in the set satisfies a preset standard corresponding to the parameter, outputting the candidate image as a palmprint-matched contrast palmprint image if all the state parameters satisfy the corresponding preset standards, and neglecting the candidate image and returning to step B if any state parameter in the set does not satisfies the corresponding preset standard; and
step D. matching the contrast palmprint image with one or more pre-recorded benchmark palmprint images according to a preset algorithm, and determining to pass authentication of a user if the matching is successful; and outputting an authentication failure prompt to a user or returning to step B if the matching is unsuccessful.

13. The method according to claim 12, wherein the state parameters comprise a focusing state parameter and an exposure state parameter, wherein:
the focusing state parameter comprises focusing completion and focusing in progress;
the exposure state parameter comprises exposure in adjusting and exposure adjusting completion; and
the preset standards are respectively that the focusing state parameter characterizes focusing completion and the exposure state parameter characterizes exposure adjusting completion.

14. The method according to claim 12, wherein before step A, the method further comprises:
setting the focusing parameter and the exposure parameter of the built in camera into fixed values; and
step C particularly comprises: outputting a distance error prompt message to the user when any one of the focusing state parameter and the exposure state parameter of the state parameter set does not satisfy the corresponding preset standard.

15. The method according to claim 12, further comprising:

step E. disabling the built in camera and the lighting lamp after passing the authentication.

16. The method according to claim 12, further comprising:
   step F1. starting a timer having a preset duration when the palmprint authentication flow is started; and
   step F2. stopping the palmprint authentication flow and outputting an authentication failure prompt to the user in the case that the timer is overtime.

17. The method according to claim 12, further comprising:
   step G1. after the palmprint authentication flow is started, waiting for a screening contrast instruction of the user; and
   step G2. performing step B after the screening contrast instruction issued by the user is received.

18. The method according to claim 12, the method, before step A, further comprises:
   enabling the built in camera when a benchmark recording flow is started and keeping the working state of the lighting lamp to be set into a lighting mode when external illumination is insufficient, so as to provide supplementary lighting output for the built in camera; and step B further comprises:
   pre-saving the contrast palmprint image outputted by the built in camera as a benchmark palmprint image in the case that the benchmark recording flow is started.

19. The method according to claim 12, wherein step A further comprises:
   setting the working state of the lighting lamp into a lighting mode when external illumination is sufficient, so as to provide supplementary lighting output for the built in camera.

20. The method according to claim 12, wherein step A further comprises:
   determining a lighting level according to an external lighting parameter provided by a light-sensing sensor of the mobile terminal, and determining the supplementary lighting output intensity of the lighting lamp according to the lighting level.

21. The method according to claim 12, wherein step A further comprises:
   when enabling the built in camera, setting the built in camera into a continuous auto-focusing mode and a continuous auto-exposure mode.

* * * * *